(12) United States Patent
Shan et al.

(10) Patent No.: US 8,271,048 B2
(45) Date of Patent: Sep. 18, 2012

(54) OPERATION MODE SWITCHING METHOD FOR COMMUNICATION SYSTEM, MOBILE TERMINAL AND DISPLAY SWITCHING METHOD THEREFOR

(75) Inventors: Wenying Shan, Beijing (CN); Xiaobing Huang, Beijing (CN); Xiaoxia Liang, Beijing (CN); Xianghua Xu, Beijing (CN); Xiaoding Li, Beijing (CN); Chunhui Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 346 days.

(21) Appl. No.: 12/627,782

(22) Filed: Nov. 30, 2009

(65) Prior Publication Data

US 2010/0137035 A1  Jun. 3, 2010

(30) Foreign Application Priority Data

Dec. 1, 2008 (CN) .......................... 2008 1 0227920
Dec. 22, 2008 (CN) .......................... 2008 1 0240278

(51) Int. Cl.
*H04B 1/38* (2006.01)
(52) U.S. Cl. .................. 455/566; 455/550.1; 455/556.1; 455/456.1
(58) Field of Classification Search .................. 455/566, 455/550.1, 556.1, 456.1
See application file for complete search history.

(56) References Cited

U.S. PATENT DOCUMENTS

2009/0174558 A1 * 7/2009 White .......................... 340/573.1

FOREIGN PATENT DOCUMENTS

CN 101090550 A 12/2007
* cited by examiner

*Primary Examiner* — Sanh Phu
(74) *Attorney, Agent, or Firm* — Osha • Liang LLP

(57) ABSTRACT

A mobile terminal and an operation mode switching method for a mobile terminal communication system are provided, the mobile terminal comprising at least a communication processor, wherein an operation mode in which the communication processor performs only a communication function is defined as a communication mode and an operation mode in which the communication processor performs both the communication function and an application function is defined as an application mode, the method comprising the following steps of acquiring, in the application mode, switching trigger information; and controlling the communication processor to switch from the application mode to the communication mode based on the switching trigger information. Also, in the communication mode, the system can also acquire switching information and switch from the communication mode to the application mode. The switching approach according to the present invention enables the communication processor to operate in the communication mode for performing the communication function only. Thus, the application function of the communication processor is not required to be started at all times, such that the occupation for the system resources as well as the system power consumption can be reduced.

28 Claims, 10 Drawing Sheets

OPERATION MODE SWITCHING METHOD FOR COMMUNICATION SYSTEM, MOBILE TERMINAL AND DISPLAY SWITCHING METHOD THEREFOR

FIELD OF THE INVENTION

The present invention relates to the field of computer technology, and more particularly, to an operation mode switching method for a communication system, a mobile terminal and display switching method therefor.

BACKGROUND OF THE INVENTION

A smart phone is an intelligent mobile terminal in which a Personal Digital Assistant (PDA) function is incorporated for allowing a user to browsing web pages and send/receive e-mails. When implementing its functions, the smart phone uses an architecture in which an application processor (AP) and a communication processor (CP) are combined and the communication processor serves as a peripheral of the application processor. The application processor performs functions such as audio/video playing as well as document reading and processing. The communication processor provides the application processor with communication paths to enable the communication function. In the design of the existing smart mobile terminal, the AP system serves as the master device while other peripherals such as a display and a keyboard are connected to the AP system via an input/output (I/O) interface. In addition, the CP is also connected to the AP via the I/O interface to serve as a peripheral of the AP system.

With the improvement of the application capability of the CP system in the smart mobile terminal, it is desired to reduce the power consumption of the AP system. When it is only required to provide a generic application capability, the smart mobile terminal can operate in a state in which only the CP system is in control. In such a state, all peripherals are connected to the CP system and the AP system is powered off. When the smart mobile terminal is required to provide a higher application capability, the AP system can be simply started. In a state in which only the CP system is powered on, the smart mobile terminal can achieve generic upper layer applications such as web browsing and agenda management, in addition to the communication function. Accordingly, it is required to load upper layer software required for these upper layer applications into the CP system. If at this time the AP system is powered on, it is only required during a switching process to switch the peripherals originally connected to the CP system to the AP system for connection, while the upper layer software which has already been started within the CP system remains operative. Thus, When the CP system is only required to perform the communication function, a large amount of system resources will be occupied if the upper layer software remains within the CP system, resulting in the increase of system power consumption.

For the existing mobile smart terminal, such as mobile phone and PDA, there has been an increasing requirement for higher computational capability as well as longer battery lifetime. A typical display process by the mobile smart terminal involves a master processor and a slave processor. The slave processor is connected to the master processor, serves as the slave device of the master processor and is controlled by the master processor. The liquid crystal display (LCD) of the smart terminal is connected to the slave processor directly while being controlled by the master processor.

In research of the display control process of the existing mobile smart terminal, the inventor of the present invention made the following discoveries. In the display control process of the existing mobile smart terminal, the master processor transmits a control signal to the slave processor which then processes the LCD display under control of the master processor. These two processors have to be started in controlling both a low power consumption LCD display and a high power consumption LCD display, resulting in the increase of the power consumption within the mobile terminal.

SUMMARY OF THE INVENTION

An object of the present invention is to provide an operation mode switching method for a mobile terminal communication system and a mobile terminal applying the switching method, so as to solve the problem in the prior art that a large amount of system resources may be occupied as the application software remains started when the communication system is only required to perform the communication function.

Another object of the present invention is to provide a mobile terminal and display switching method therefor, so as to solve the problem in the prior art that both the master and the slave processors have to be started in display control, causing increase of the power consumption within the mobile terminal.

To solve the above technical problem, the following solutions are provided.

An operation mode switching method for a mobile terminal communication system, the mobile terminal comprising at least a communication processor, wherein an operation mode in which the communication processor performs only a communication function is defined as a communication mode and an operation mode in which the communication processor performs both the communication function and an application function is defined as an application mode, the method comprising the following steps of:

acquiring, in the application mode, switching trigger information; and controlling the communication processor to switch from the application mode to the communication mode based on the switching trigger information.

An operation mode switching method for a mobile terminal communication system, the mobile terminal comprising at least a communication processor, wherein an operation mode in which the communication processor performs only a communication function is defined as a communication mode and an operation mode in which the communication processor performs both the communication function and an application function is defined as an application mode, the method comprising the following steps of:

acquiring, in the communication mode, switching trigger information; and controlling the communication processor to switch from the communication mode to the application mode based on the switching trigger information.

A mobile terminal, comprising at least a communication processor, wherein an operation mode in which the communication processor performs only a communication function is defined as a communication mode and an operation mode in which the communication processor performs both the communication function and an application function is defined as an application mode, wherein the communication processor comprises:

a first acquisition unit configured to acquire, in the application mode, switching trigger information; and a first control unit configured to control the communication processor to switch from the application mode to the communication mode based on the switching trigger information.

A mobile terminal, comprising at least a communication processor, wherein an operation mode in which the communication processor performs only a communication function is defined as a communication mode and an operation mode in which the communication processor performs both the communication function and an application function is defined as an application mode, wherein the communication processor comprises:

a second acquisition unit configured to acquire, in the communication mode, switching trigger information; and a second control unit configured to control the communication processor to switch from the communication mode to the application mode based on the switching trigger information.

It can be seen from the above solution according to the present invention that the communication processor of the mobile terminal according to the present invention can operate either in the communication mode for performing the communication function only, or in the application mode for performing both the communication function and the application function. The communication processor may be switched between the communication mode and the application mode by acquiring the switching trigger information. This switching approach enables the communication processor to operate, when no application function is required, in the communication mode for performing the communication function only. Thus, the application function of the communication processor is not required to be started at all times, such that the occupation for the system resources as well as the system power consumption can be reduced.

A display switching method for a mobile terminal which comprises at least a first processor and a second processor, a state in which a display module is controlled by the first processor being defined as a first state and a state in which the display module is controlled by the second processor being defined as a second state, the method comprising the following steps of:

receiving, by the first processor, a display switching command in the first state;

obtaining, by the first processor, a control parameter;

transmitting, by the first processor, the control parameter to the second processor for controlling the mobile terminal to switch to the second state; and controlling, by the second processor, the display module according to the control parameter.

A display switching method for a mobile terminal which comprises at least a first processor and a second processor, a state in which a display module is controlled by the first processor being defined as a first state and a state in which the display module is controlled by the second processor being defined as a second state, the method comprising the following steps of:

receiving, by the first processor, a display switching command transmitted from the second processor in the second state;

obtaining, by the second processor, a control parameter;

transmitting, by the second processor, the control parameter to the first processor; and controlling, by the first processor, the display module according to the control parameter after controlling the mobile terminal to switch to the first state.

A mobile terminal, comprising at least a first processor and a second processor, a state in which a display module is controlled by the first processor being defined as a first state and a state in which the display module is controlled by the second processor being defined as a second state, wherein the first processor comprises:

a receiving unit configured to receive a display switching command in the first state;

a providing unit configured to obtain a control parameter and transmit the control parameter to the second processor; and a switching unit configured to control the mobile terminal to switch to the second state; and the second processor comprises:

an acquisition unit configured to acquire the control parameter provided by the providing unit; and a control unit configured to control the display module according to the control parameter.

A mobile terminal, comprising at least a first processor and a second processor, a state in which a display module is controlled by the first processor being defined as a first state and a state in which the display module is controlled by the second processor being defined as a second state, wherein the first processor comprises:

a receiving unit configured to receive a display switching command transmitted from the second processor in the second state; and the second processor comprises:

a providing unit configured to obtain a control parameter and transmit the control parameter to the first processor; and the first processor further comprises:

an acquisition unit configured to acquire the control parameter provided by the providing unit; and a switching unit configured to control the mobile terminal to switch to the first state; and a control unit configured to control the display module according to the control parameter.

It can be seen from the above solution according to the present invention that the first and second processors of the mobile terminal according to the present invention can control the display module separately. After receiving the display switching command, these two processors exchange the control parameter such that the processor to which the display control is switched can control the display module independently. The two processors of the present invention can control the display module separately such that the display control can be switched to the appropriate processor according to the display content, thereby improving the flexibility of the display control. Further, as only one processor controls the display module the system power consumption can be reduced and the lifetime of the battery in the mobile terminal can be prolonged accordingly.

DETAILED DESCRIPTION OF THE PREFERRED EMBODIMENTS

A core concept of the present invention is to provide an operation mode switching method for a mobile terminal communication system and a mobile terminal applying the switching method. In the following, the present invention will be further detailed with reference to the drawings and particular embodiments such that those who skilled in the art can better understand the solution of the present invention and the above object, features and advantages can be more apparent.

The mobile terminal according to the embodiments of the present invention comprises at least a communication processor, wherein an operation mode in which the communication processor performs only a communication function is defined as a communication mode and an operation mode in which the communication processor performs both the communication function and an application function is defined as an application mode.

Figure 1:
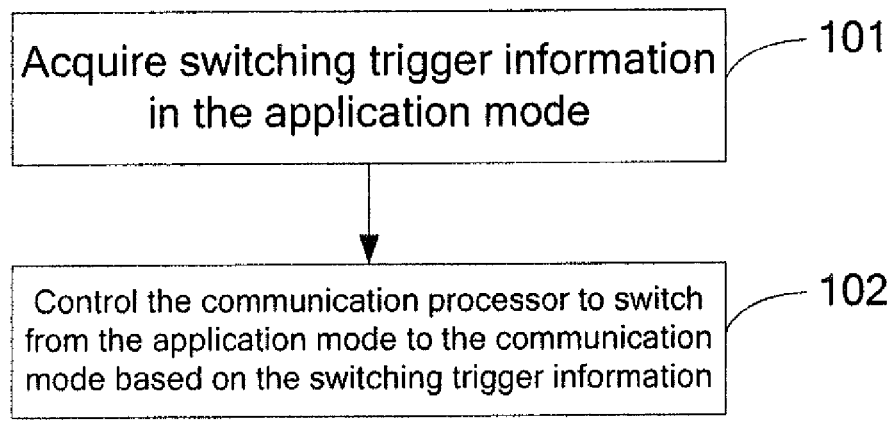
FIG. 1 is a flowchart of the first embodiment of the operation mode switching method for the communication system according to the present invention.

FIG. 1 shows the flowchart of the operation mode switching method for the mobile terminal communication system according to the first embodiment of the present invention. This embodiment shows the process in which the mobile terminal communication system is switched from the application mode to the communication mode.

At step 101, switching trigger information is acquired in the application mode.

Herein, when the mobile terminal further comprises an application processor, the switching trigger information is information indicating to switching to a state in which the application processor is in control. When the mobile terminal only comprises the communication processor, the switching trigger information is information which is received when the mobile terminal accesses another electronic device and indicates the entrance of the communication mode.

At step 102, the communication processor is controlled to switch from the application mode to the communication mode based on the switching trigger information.

Figure 2:
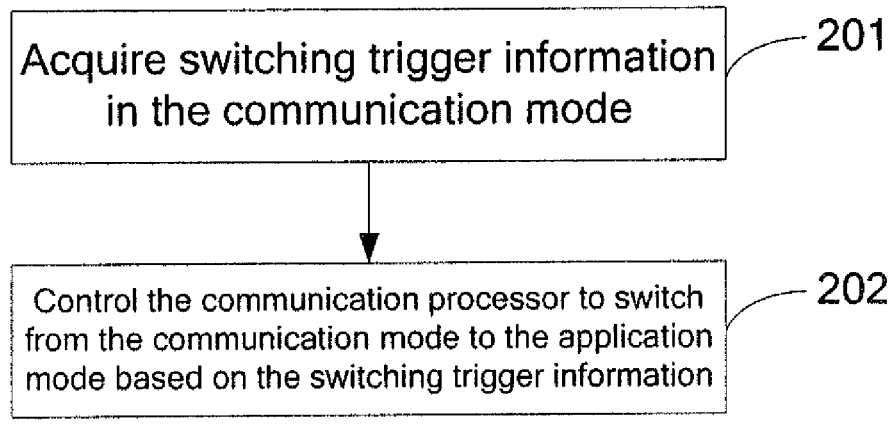
FIG. 2 is a flowchart of the second embodiment of the operation mode switching method for the communication system according to the present invention.

FIG. 2 shows the flowchart of the operation mode switching method for the mobile terminal communication system according to the second embodiment of the present invention. This embodiment shows the process in which the mobile terminal communication system is switched from the communication mode to the application mode.

At step 201, switching trigger information is acquired in the communication mode.

Herein, when the mobile terminal further comprises an application processor, the switching trigger information is information indicating to switching from a state in which the application processor is in control to a state in which the communication processor is in control. When the mobile terminal only comprises the communication processor, the switching trigger information is information indicating the disconnection of the mobile terminal from another electronic device or information which is received when the mobile terminal accesses another electronic device and indicates an incoming call.

At step 202, the communication processor is controlled to switch from the communication mode to the application mode based on the switching trigger information.

Figure 3:
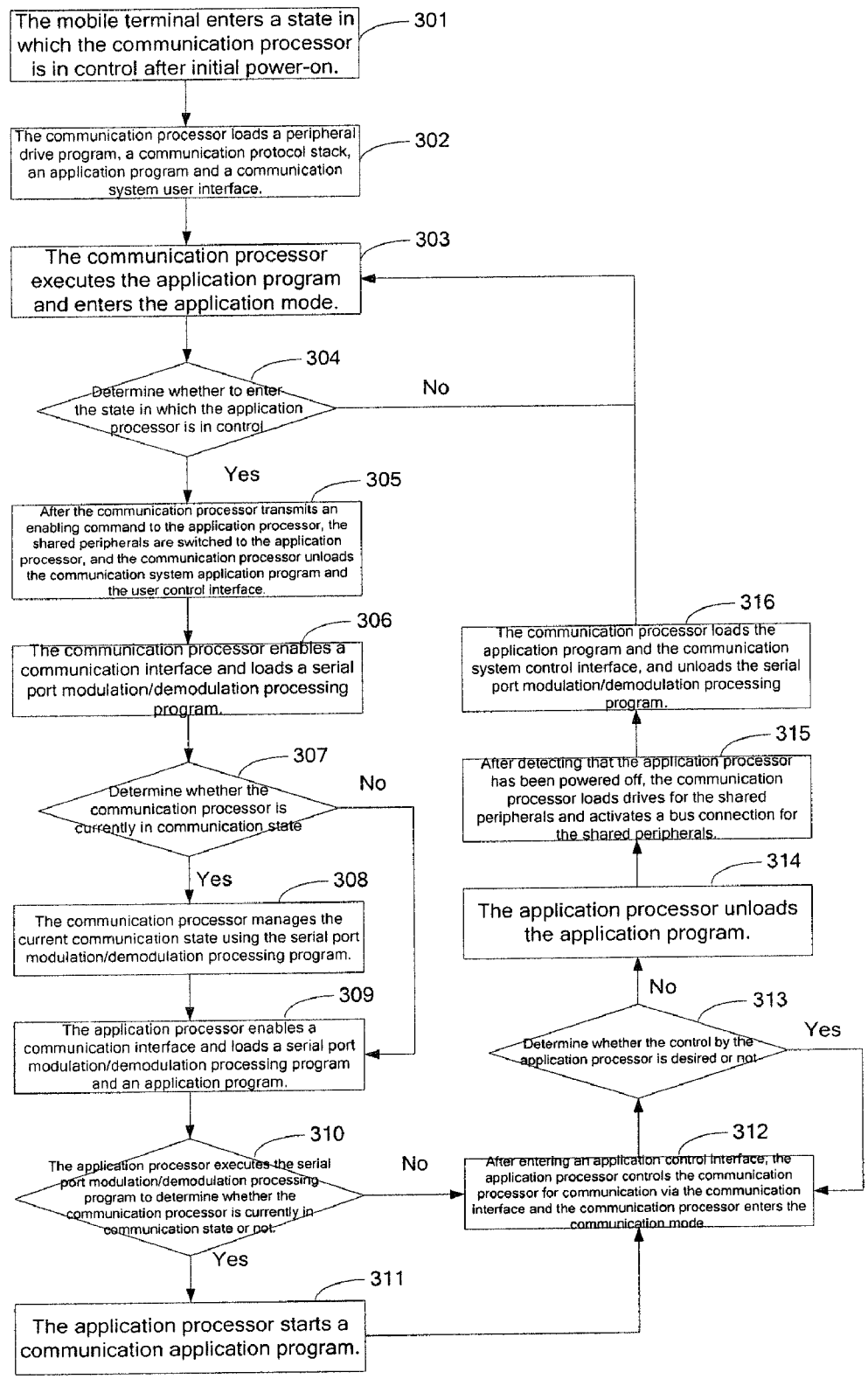
FIG. 3 is a flowchart of the third embodiment of the operation mode switching method for the communication system according to the present invention.

FIG. 3 shows the flowchart of the operation mode switching method for the mobile terminal communication system according to the third embodiment of the present invention. This embodiment shows the switching process for the operation mode of the communication processor in the case where the mobile terminal further comprises an application processor and the control is switched between the communication processor and the application processor.

At step 301, the mobile terminal enters a state in which the communication processor is in control after initial power-on.

The mobile terminal of the present invention can operate either in a state in which the communication processor is in control or in a state in which the application processor is in control. The power consumption of the communication processor is lower than that of the application processor. Thus, the mobile terminal initially enters the state in which the communication processor is in control after power-on. Subsequently, the mobile terminal can be switched between these two states depending on the requirement of an application, thereby reducing the power consumption to a minimum level.

At step 302, the communication processor loads a peripheral drive program, a communication protocol stack, an application program and a communication system user interface.

When entering the state in which the communication processor is in control, the communication processor loads the peripheral drive program such that the shared peripherals, such as a display screen and a keyboard, and the peripheral dedicated to the communication processor can be connected to the communication processor; loads the communication protocol stack such that the communication processor can implement the underlying communication protocols; loads the application program such that the communication processor can achieve basic application functions such as voice call, short message service, web browsing and agenda management; and loads the communication system user interface such that the user can perform various operations via the display screen in the state in which the communication processor is in control.

At step 303, the communication processor executes the application program and enters the application mode.

After loading the peripheral drive program, the communication protocol stack, the application program and the communication system user interface, the communication processor executes the application program. Then, the mobile terminal enters the application mode in which the communication processor is in control and the communication function and the basic application functions can be achieved.

At step 304, it is determined whether to enter the state in which the application processor is in control. If so, the process proceeds with step 305; otherwise, the process returns to step 303.

When the application function of the communication processor cannot satisfy user requirements such as video playing, office software operation, enterprise service or cooperative computing, it is desired to switch from the state in which the communication processor is in control to the state in which the application processor is in control.

At step 305, after the communication processor transmits an enabling command to the application processor, the shared peripherals are switched to the application processor, and the communication processor unloads the communication system application program and the user control interface.

When it is desired to enter the state in which the application processor is in control, the communication processor initially transmits an enabling command to the application processor for requesting the latter to power on, while switching the shared peripherals such as a LCD and a keyboard to the application processor. The communication processor unloads the peripheral drive program and sets the input/output interface for connecting the shared peripherals to a high resistive state to reduce the system power consumption. Since the application processor can perform all application functions and basic functions, including basic applications (e.g., voice all, wireless networking, agenda management, etc.) and complicated applications (e.g., video playing, office calculation, etc.), the communication processor serves in this case as a peripheral of the application processor which is only required to provide the application processor with paths for wireless communication, without executing the basic application functions. Thus, the communication processor unloads the communication system application program and the communication system control interface and prepares for entering the state in which the application processor is in control.

At step 306, the communication processor enables a communication interface and loads a serial port modulation/demodulation processing program.

After unloading the application program and the communication system control interface, the communication processor is no longer required to perform the application function but is still required to perform the communication function. Thus, the communication processor enables a communication interface and loads a serial port modulation/demodulation processing program for communication management, which can be an Attention (AT) program.

At step 307, it is determined whether the communication processor is currently in communication. If so, the process proceeds with step 308; otherwise, the process proceeds with step 309.

During the switching from the communication processor to the application processor, it is possible that the communication processor is performing the communication function. Thus, it is necessary to determine the current operation state of the communication processor.

At step 308, the communication processor manages the current communication state using the serial port modulation/demodulation processing program.

Since the communication processor is currently in communication state, the serial port modulation/demodulation processing program takes over the ongoing communication.

At step 309, the application processor enables a communication interface and loads a serial port modulation/demodulation processing program and an application program.

During the switching, the application processor is also required to enable the communication interface and load the serial port modulation/demodulation processing program, so as to control the communication process of the communication processor. At the same time, the application processor loads the application program including the basic application program and the complicated application program.

At step 310, the application processor executes the serial port modulation/demodulation processing program to determine whether the communication processor is currently in communication state or not. If so, the process proceeds with step 311; otherwise the process proceeds with step 312.

After enabling the communication interface, the application processor detects the communication interface of the communication processor by invoking the serial port modulation/demodulation processing program, so as to determine whether the communication processor is currently in communication state.

At step 311, the application processor starts a communication application program.

Since the communication processor is currently in communication state, the application processor starts a corresponding communication application program, invokes the serial port modulation/demodulation processing program and continues the ongoing communication function.

At step 312, after entering an application control interface, the application processor controls the communication processor for communication via the communication interface and the communication processor enters the communication mode.

After successfully switching to the state in which the application processor is in control, the communication processor performs only the communication function without performing the application function. In implementing the communication function, the application processor controls via the communication interface the communication processor to perform the communication function. The communication processor completes its switching from the application mode to the communication mode.

At step 313, it is determined whether the control by the application processor is desired or not. If so, the process returns to step 312; otherwise the process proceeds with step 314.

After the mobile terminal enters the state in which the application processor is in control, the application processor can accomplish various complicated applications. After using the complicated applications, for example, it is desired to switch from the state in which the application processor is in control to the state in which the communication processor is in control, or it is required to determine in real time whether the control by the application processor remains desired or not after starting the application processor, in order to save the power consumption of the application processor after the application processor enters a sleep state for a period.

At step 314, the application processor unloads the application program.

If there is no need for the control by the application processor, the application processor unloads the application program and the peripheral drive program, sets the input/output interface for connecting peripherals as high resistive state, and switches the share peripherals such as a LCD and a keyboard to the communication processor. Then, the application processor is powered off and the mobile terminal is switched to the state in which the communication processor is in control.

At step 315, after detecting that the application processor has been powered off, the communication processor loads drives for the shared peripherals and activates a bus connection for the shared peripherals.

After the application processor is powered off, the shared peripherals such as a LCD and a keyboard are switched to the communication processor which loads drives for the shared peripherals and activates a bus connection for the shared peripherals. The mobile terminal enters the state in which the communication processor is in control.

At step 316, the communication processor loads the application program and the communication system control interface, and unloads the serial port modulation/demodulation processing program. The method then returns to step 303.

The communication processor loads the drives for the shared peripherals such that the shared peripherals, such as a display screen and a keyboard, can be connected to the communication processor; loads the application program such that the communication processor can achieve basic application functions such as web browsing and agenda management; and loads the communication system user interface such that the user can perform various operations via the display screen in the state in which the communication processor is in control. After the completion of the loading process, the process returns to step 303 where the communication processor is switched from the communication mode to the application mode.

Figure 4:
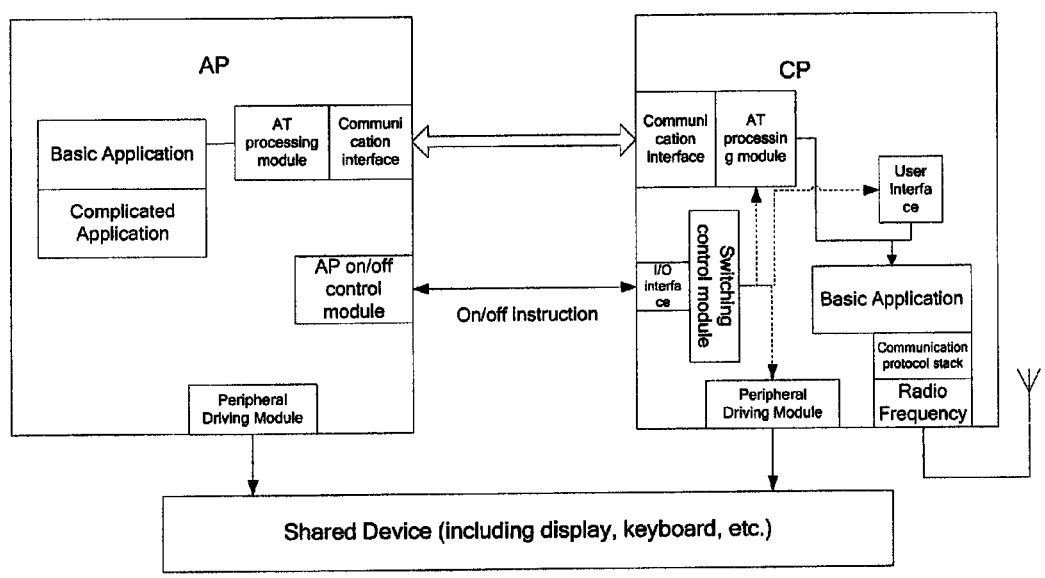
FIG. 4 is a schematic diagram showing the system architecture of the mobile terminal as shown in FIG. 3.

In combination with the method according to the third embodiment of the present invention as described above, FIG. 4 shows the schematic diagram of the system architecture of the mobile terminal according to the present invention, which comprises an application processor (AP) and a communication processor (CP).

After initial power-on, the mobile terminal enters a state in which the CP is in control. In this case, the shared peripherals such as the LCD and the keyboard are connected to the CP. The CP loads a peripheral drive program via a peripheral driving module, loads an operating system as well as a basic application program, a communication protocol stack and a user interface. After initial power-on, the CP operates in the application mode to perform wireless communication via a radio frequency module and perform basic application functions such as voice call, short message transmission or agenda management by executing the loaded basic application program.

When the mobile terminal is required to perform a complicated application such as video playing or cooperative computing, it is desired to switch to the state in which the AP is in control. At this time, the switching control module of the CP transmits an enabling command to the AP on/off control module via the I/O interface. Meanwhile, the switching control module executes a switching control program for controlling the peripheral driving module to unload the peripheral drive program, setting the shared peripherals as high resistive state and switching the shared peripherals such as the LCD and the keyboard to the AP, as well as controlling to unload the user interface and the basic application software and loading a drive program for the communication interface and an AT processing module. After loading the AT processing module, the AT processing module will take over the current communication process if the CP is currently in communication. The mobile terminal switches from a state in which it is controlled by the CP to a state in which it is controlled by the AP. In this case, the CP serves as a peripheral of the AP. After power-on, the AP loads a drive program for the communication interface, an AT processing module, a basic application and a complicated application. When detecting via the communication interface that the CP is in a communication state (e.g., a voice call state or a data transmission state), the AP starts the communication application program and takes over the current communication states using the AT processing module. Subsequently, the AP controls via the communication interface the CP to perform the communication function. In this case, the CP is switched from the application mode to the communication mode.

When the mobile terminal is not required to perform any complicated application, or when the AP has entered a sleep state for a period, it is desired to switch from the state in which the AP is in control to the state in which the CP is in control, such that the power consumption of the mobile terminal can be reduced. In this case, the AP unloads the peripheral drive program via the peripheral driving module, sets the input/output interface for the shared peripherals as high resistive state, and switches the shared peripherals to the CP. Also, the AP unloads the basic application program, the complicated application program and the AT processing program before power-off. On detection of the power-off of the AP, the CP loads the peripheral drive program, the basic application program and the user interface, and unloads the AT processing program. Thus, the CP is switched from the communication mode to the application mode.

Figure 5:
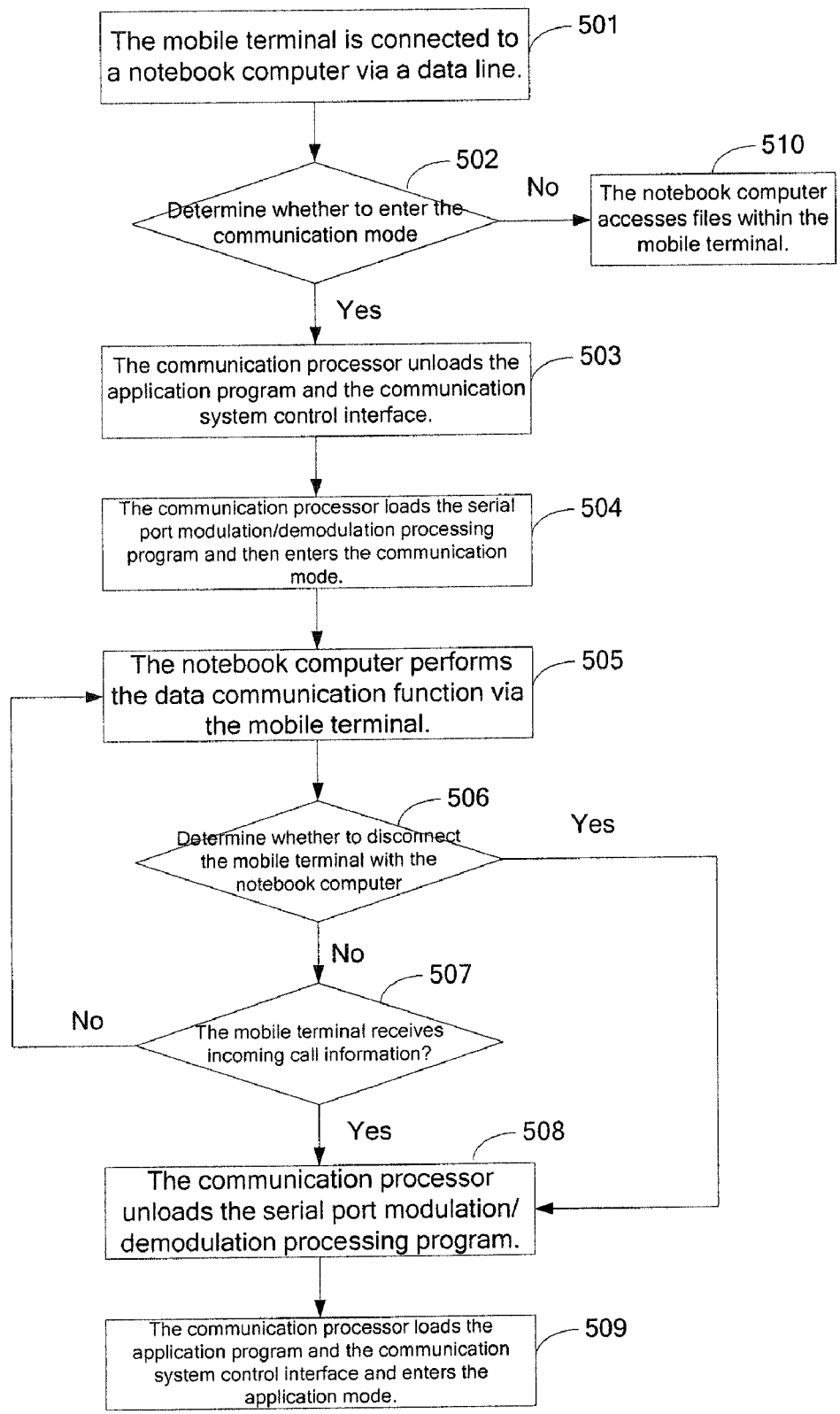
FIG. 5 is a flowchart of the fourth embodiment of the operation mode switching method for the communication system according to the present invention.

FIG. 5 shows the flowchart of the operation mode switching method for the mobile terminal communication system according to the fourth embodiment of the present invention. This embodiment shows the operation mode switching process for the communication processor when the mobile terminal is connected to a notebook computer.

At step 501, the mobile terminal is connected to a notebook computer via a data line.

The mobile terminal according to the present invention can be a mobile terminal comprising only the communication processor. In a normal state, the mobile terminal is in an application mode in which both the application function and the communication function can be performed.

At step 502, it is determined whether to enter the communication mode or not. If so, the process proceeds with step 503; otherwise the process proceeds with step 510.

The notebook computer can access to networks via the mobile terminal or use the mobile terminal as a storage medium for reading data. In the above application state, the mobile terminal is not required to perform the application function. Thus, when the mobile terminal is connected to the notebook computer via the data line, it is prompted whether to enter the communication mode or not.

At step 503, the communication processor unloads the application program and the communication system control interface.

When it is desired to enter the communication mode, the communication processor unloads the peripheral drive program, sets the input/output interface for the peripherals as high resistive state, and unloads the application program and the user interface.

At step 504, the communication processor loads the serial port modulation/demodulation processing program and then enters the communication mode.

The communication processor loads the serial port modulation/demodulation processing program for managing data communication. Then, the communication processor is switched from the application mode to the communication processor.

At step 505, the notebook computer performs the data communication function via the mobile terminal.

After the communication processor enters the communication mode, the system resources consumed due to the execution of the application program can be reduced and the notebook computer can perform the data communication function (e.g., access to network) via the mobile terminal.

At step 506, it is determined whether to disconnect the mobile terminal with the notebook computer or not. If so, the process proceeds with step 508; otherwise, the process proceeds with step 507.

At step 507, it is determined whether the mobile terminal receives incoming call information. If so, the process proceeds with step 508; otherwise, the process returns to step 505.

At step 508, the communication processor unloads the serial port modulation/demodulation processing program.

When the mobile terminal needs to disconnect from the notebook computer, or when the mobile terminal receives incoming call information, the mobile terminal needs to disconnect from the notebook computer to implement the application function. In this case, the communication processor unloads the serial port modulation/demodulation processing program first.

At step 509, the communication processor loads the application program and the communication system control interface and enters the application mode. The present flow is then ended.

The communication processor loads the peripheral drive program, the application program and the user interface simultaneously and switches from the communication mode to the application mode.

At step 510, the notebook computer accesses files within the mobile terminal and the present flow is then ended.

When there is no need for entering the communication mode, the mobile terminal serves as a storage medium. The notebook computer can access the files within the mobile terminal.

Corresponding to the embodiments of the operation mode switching method for the mobile terminal communication system according to the present invention, a mobile terminal applying these method embodiments are also provided.

Figure 6:
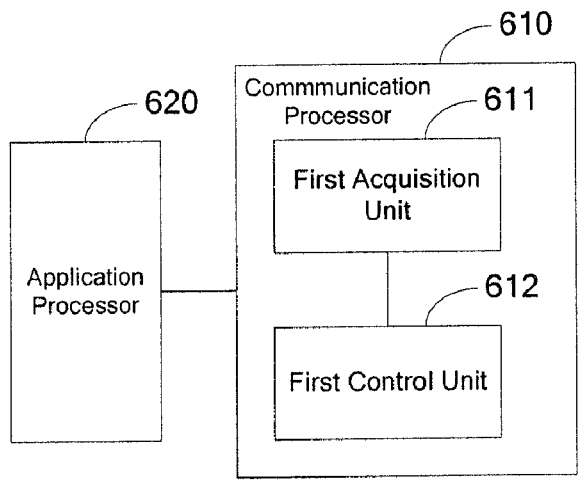
FIG. 6 is a block diagram of the first embodiment of the mobile terminal according to the present invention.

FIG. 6 shows the block diagram of the mobile terminal according to the first embodiment of the present invention. This mobile terminal comprises at least a communication processor 610 and may further comprise an application processor 620. The operation mode in which the communication processor 610 performs only the communication function is defined as the communication mode while the operation mode in which the communication processor 610 performs both the communication function and the application function is defined as the application mode.

The communication processor 610 comprises a first acquisition unit 611 configured to acquire, in the application mode, switching trigger information; and a first control unit 612 configured to control the communication processor 610 to switch from the application mode to the communication mode based on the switching trigger information.

Figure 7:
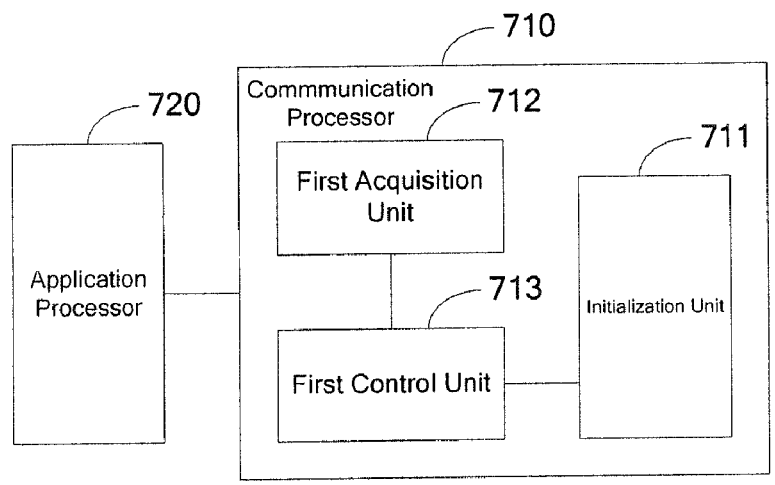
FIG. 7 is a block diagram of the second embodiment of the mobile terminal according to the present invention.

FIG. 7 shows the block diagram of the mobile terminal according to the second embodiment of the present invention. This mobile terminal comprises at least a communication processor 710 and may further comprise an application processor 720.

The communication processor 710 comprises an initialization unit 711 configured to cause the mobile terminal to enter the application mode in which the communication processor 710 is in control after initial power-on of the mobile terminal; a first acquisition unit 712 configured to acquire, in the application mode, switching trigger information; and a first control unit 713 configured to control the communication processor 710 to switch from the application mode to the communication mode based on the switching trigger information.

Herein, the first acquisition unit 712 can comprise a switching information acquisition unit configured to acquire, when the mobile terminal further comprises an application processor, information indicating to switch to the state in which the application processor 710 is in control. Accordingly, the first control unit 713 can comprise a first unload unit configured to unload an application program and a user control interface after transmitting to the application processor 720 an enabling command, and a first load unit configured to enable a communication interface and load a serial port modulation/demodulation processing program. The application processor 720 can comprise a second enabling unit configured to enable the communication interface and load the serial port modulation/demodulation processing program; a second load unit configured to load a drive and an operating system and to load the application program and the user interface for the application processing system; and a communication control unit configured to communicate with the communication processor 710 via the communication interface.

Further, the first control unit 713 can further comprise a first determination and execution unit configured to invoke, when determining the communication processor 710 is currently in the communication state, the serial port modulation/demodulation processing program to manage the communication state. The application processor can further comprise a second determination and execution unit configured to invoke, when determining the communication processor 710 is currently in the communication state, the serial port modulation/demodulation processing program and the communication application program.

Herein, the first acquisition unit 712 can comprise an access information acquisition unit configured to receive information indicating to enter the communication mode when the mobile terminal accesses another electronic device. Accordingly, the first control unit 713 can further comprise a third unload unit configured to unload the application program and the user interface; and a third load unit configured to load the serial port modulation/demodulation processing program and then enter the communication mode in which only the data communication function is performed.

Figure 8:
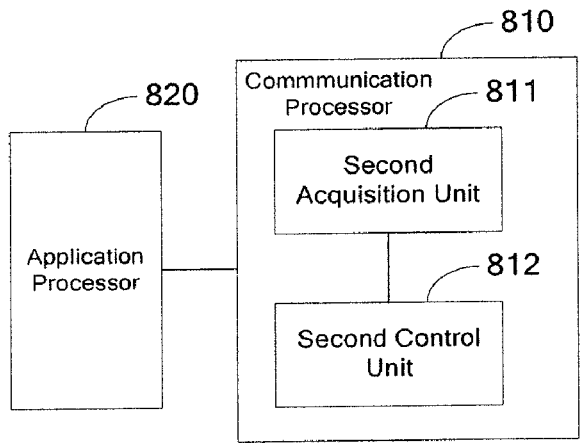
FIG. 8 is a block diagram of the third embodiment of the mobile terminal according to the present invention.

FIG. 8 shows the block diagram of the mobile terminal according to the third embodiment of the present invention. This mobile terminal comprises at least a communication processor 810 and may further comprise an application processor 820. The operation mode in which the communication processor 810 performs only the communication function is defined as the communication mode while the operation mode in which the communication processor 810 performs both the communication function and the application function is defined as the application mode.

The communication processor 810 comprises a second acquisition unit 811 configured to acquire, in the communication mode, switching trigger information; and a second control unit 812 configured to control the communication processor 810 to switch from the communication mode to the application mode based on the switching trigger information.

Herein, the second acquisition unit 811 can comprise a switching information acquisition unit configured to acquire information indicating switching from the state in which the application processor is in control to the state in which the communication processor 810 is in control. Accordingly, the second control unit 812 can comprise an unload detection unit configured to detect for the communication processor 810 that the application processor 820 is powered off after performing a power-off program; a first unload unit configured to unload the serial port modulation/demodulation processing program; and a first load unit configured to load a shared peripheral, an application program and a communication system control interface. Then, the communication processor 810 enters the application mode.

Herein, the second acquisition unit 811 can comprise a disconnection information acquisition unit configured to acquire information indicating the disconnection of the mobile terminal from another electronic device or incoming call information received when accessing another electronic device. Accordingly, the second control unit 812 can comprise a second unload unit configured to unload the serial port modulation/demodulation processing program; and a second load unit configured to load the application program and the communication system control interface. Then the communication processor 810 enters the application mode.

It can be seen from the description of the above embodiments that the communication processor of the mobile terminal according to the present invention can operate in the communication mode for performing the communication function only, or in the application mode for performing both the communication function and the application function. The communication processor may be switched between the communication mode and the application mode by acquiring the switching trigger information. This switching approach enables the communication processor to operate, when no application function is required, in the communication mode for performing the communication function only. Thus, the application function of the communication processor is not required to be started at all times, such that the occupation for the system resources as well as the system power consumption can be reduced.

It can be appreciated by those who skilled in the art that the present invention can be implemented by software in combination of necessary generic hardware platform. Based on this understanding, the solution of the present invention or the part contributive to the prior art can be substantially embodied in software product. This computer software product can be stored in a storage medium, such as ROM/RAM, magnetic disk, optical disk and the like, and comprises several instructions for causing a computer device (which can be a personal computer, a server or a network device) to perform the method described in the respective embodiments, or some parts thereof, according to the present invention.

Another core concept of the present invention is to provide a display switching method for a mobile terminal and a mobile terminal applying the switching method. In the following, the present invention will be further detailed with reference to the drawings and particular embodiments such that those who skilled in the art can better understand the solution of the present invention and the above object, features and advantages can be more apparent.

The mobile terminal according to the embodiments of the present invention comprises at least a first processor and a second processor each being capable of controlling a display module separately, a state in which the display module is controlled by the first processor being defined as a first state and a state in which the display module is controlled by the second processor being defined as a second state. The mobile terminal can be switched between these two states by setting a switching device.

Figure 9:
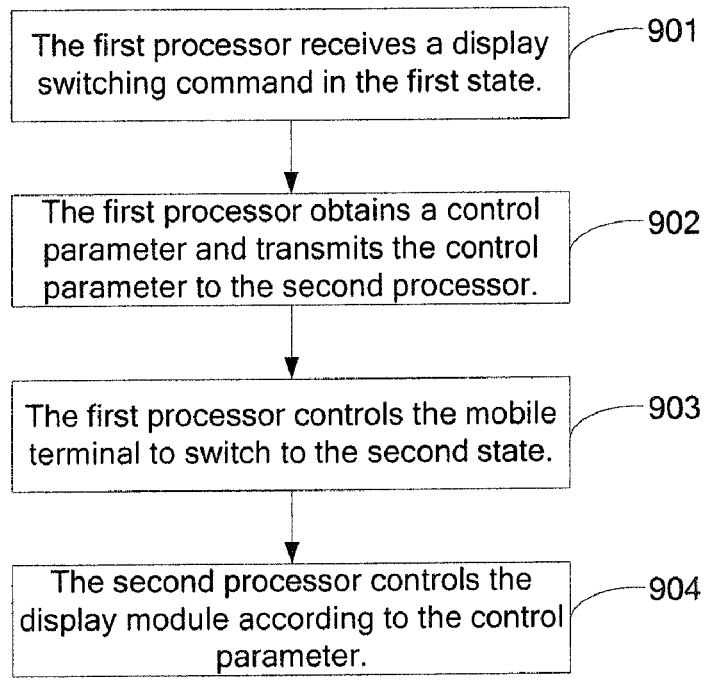
FIG. 9 is a flowchart of the first embodiment of the display switching method for the mobile terminal according to the present invention.

FIG. 9 is a flowchart of the first embodiment of the display switching method for the mobile terminal according to the present invention. This embodiment shows the display control process in which the mobile terminal is switched from the first state to the second state.

At step 901, the first processor receives a display switching command in the first state.

At step 902, the first processor obtains a control parameter and transmits the control parameter to the second processor.

Herein, the first processor records in a first memory buffer area the current control parameter which can include an environment variable parameter and a user setting parameter. After the recording, the first processor transmits a reading notice to the second processor. On receipt of the reading notice, the second processor reads the control parameter from the first memory buffer area and stores it in a second memory buffer area. Then, the second processor processes the control parameter such that the processed control parameter matches with the current second state.

At step 903, the first processor controls the mobile terminal to switch to the second state.

Herein, after receiving a notice message transmitted from the second processor indicating the completion of acquisition of the display parameter, the first processor controls the switching device to switch from the state as being connected to the first processor to the state as being connected to the second processor.

At step 904, the second processor controls the display module according to the control parameter.

Figure 10:
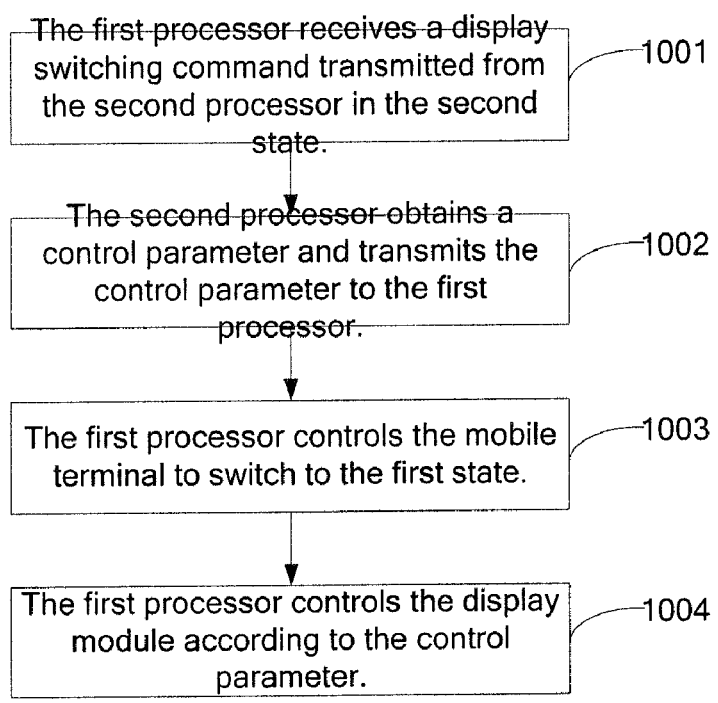
FIG. 10 is a flowchart of the second embodiment of the display switching method for the mobile terminal according to the present invention.

FIG. 10 is a flowchart of the second embodiment of the display switching method for the mobile terminal according to the present invention. This embodiment shows the display control process in which the mobile terminal is switched from the second state to the first state.

At step 1001, the first processor receives a display switching command transmitted from the second processor in the second state.

In the second state, the first processor may be in sleep state. After executing a display task, which may be the display task contained in the display switching command transmitted from the first processor to the second processor prior to switching to the second state, the second processor transmits a display switching command to the first processor.

At step 1002, the second processor obtains a control parameter and transmits the control parameter to the first processor.

Herein, the second processor records in the second memory buffer area the current control parameter which can include an environment variable parameter and a user setting parameter. After the recording, the second processor transmits a reading notice to the first processor. On receipt of the reading notice, the first processor reads the control parameter from the second memory buffer area and stores it in the first memory buffer area. Then, the second processor processes the control parameter such that the processed control parameter matches with the first state.

At step 1003, the first processor controls the mobile terminal to switch to the first state.

Herein, the first processor controls the switching device to switch from the state as being connected to the second processor to the state as being connected to the first processor. After the switching, the first processor transmits a power off command to the second processor.

At step 1004, the first processor controls the display module according to the control parameter.

Figure 11:
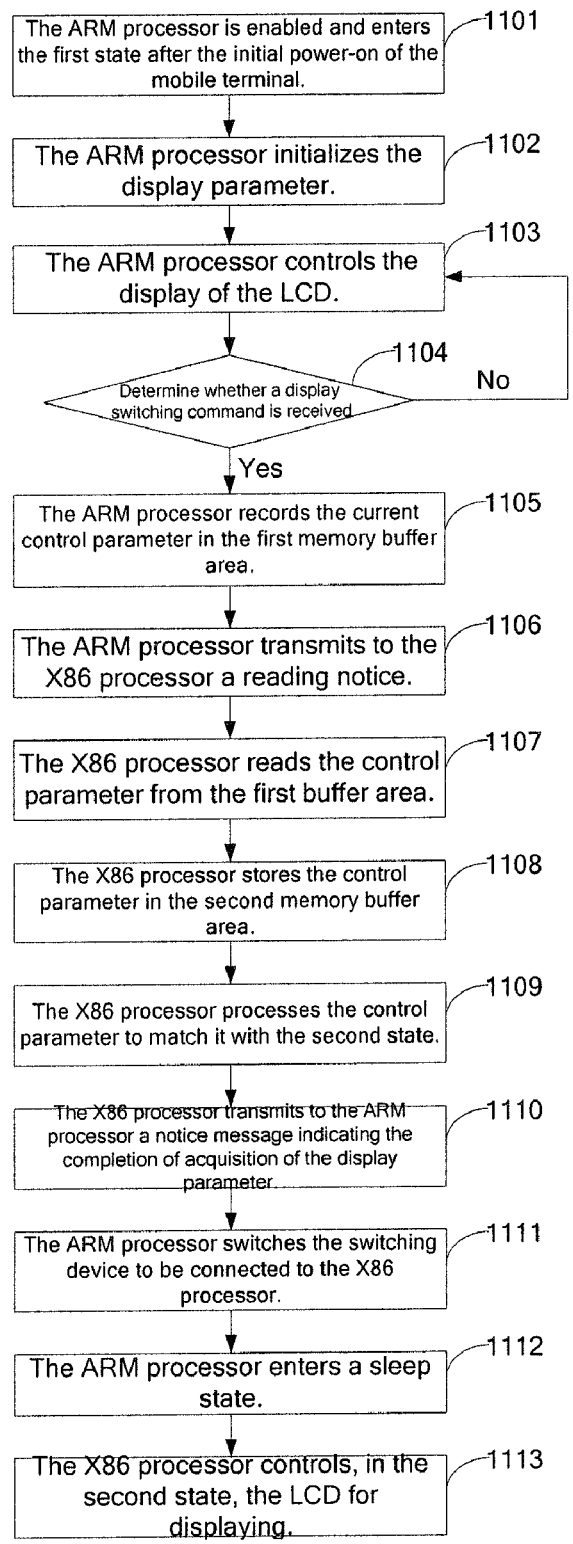
FIG. 11 is a flowchart of the third embodiment of the display switching method for the mobile terminal according to the present invention.

FIG. 11 is a flowchart of the third embodiment of the display switching method for the mobile terminal according to the present invention. This embodiment shows a display switching process in which the mobile terminal is switched from the first state to the second state after initial power-on. Herein, as an example, the first processor is an ARM processor, the second processor is an X86 processor and the display module is a LCD. The state in which the display is controlled by the ARM processor is defined as the first state, while the state in which the display is controlled by the X86 processor is defined as the second state.

At step 1101, the ARM processor is enabled to enter the first state after the initial power-on of the mobile terminal.

The ARM processor is typically a non-general-purpose processor with low power consumption and low rate. Thus, the ARM processor is usually enabled to control the LCD first after the initial power-on of the mobile terminal as the requirement for the display of the LCD is relatively low at this time.

At step 1102, the ARM processor initializes the display parameter.

The ARM processor can initialize the LCD display parameter by setting up a LCD controller. The LCD display parameter mainly includes LCD resolution, LCD scanning frequency, LCD display mode, timing sequence of the control signal for controlling the LCD, frame buffer area for transmitting information to the LCD, and setting of the direct memory access (DMA) channel.

At step 1103, the ARM processor controls the display of the LCD.

The control of the LCD by the ARM processor includes a software control and a hardware control. The ARM processor reads/writes the frame buffer area for storing control data by application software, and then uses a hardware interface to transmit the data in the frame buffer area to the LCD via the DMA channel.

Herein, as the data directly output from the hardware interface are data in the format of RGB (Red, Green and Blue), the data can be converted from the RGB format into the Low Voltage Differential Signal (LVDS) format by a conversion circuit before being transmitted to the LCD. The reason for this conversion lies in the fact that, although the LCD typically performs display output using a circuit in the RGB format, the circuit in the RGB format is susceptible to interference due to complexity in circuit arrangement. However, the signal in the format of LVDS can overcome the above problem. Thus, the ARM processor converts the output data in the RGB format into the data in the LVDS format.

At step 1104, it is determined whether a display switching command is received or not. If so, the process proceeds with step 1105; otherwise, the process returns to step 1103.

Since the ARM processor has low power consumption and low rate, when the mobile terminal needs to display data with higher requirements through the LCD, it is required to switch the processor. At this time, the mobile terminal transmits a display switching command to the ARM processor.

At step 1105, the ARM processor records the current control parameter in the first memory buffer area.

After receiving the display switching command, the ARM processor can record the current control parameter in the first memory buffer area set within the ARM processor prior to switching, so as to ensure that the control parameter currently operating on the mobile terminal remains unchanged after the switching, thereby satisfying a seamless experience of the user during the switching.

Herein, the control parameter may include an environment parameter, a user setting parameter, temporary web recording files for web browsing and the like.

At step 1106, the ARM processor transmits to the X86 processor a reading notice.

The X86 controller is typically a general purpose Windows operating system with high rate and high power consumption, capable of processing tasks with higher display requirements. Thus, after recording the current control parameter, the ARM processor transmits to the X86 processor a reading notice and prepares to switch to the second state.

At step 1107, the X86 processor reads the control parameter from the first buffer area.

At step 1108, the X86 processor stores the control parameter in the second memory buffer area.

The X86 processor has a second memory buffer area set therein, which is used to store the read control parameter.

At step 1109, the X86 processor processes the control parameter to match it with the second state.

After switching from the first state to the second state, the environment variable and the user parameter, such as call status, volume, time status, display and contrast, remain unchanged after the switching, so as to implement the seamless switching. During implementation, the parameter after the switching can match with the second state by processing the control parameter, e.g., by rewriting a memory, rewriting a register or reload a driver.

At step 1110, the X86 processor transmits to the ARM processor a notice message indicating the completion of acquisition of the display parameter.

At step 1111, the ARM processor switches the switching device to be connected to the X86 processor.

The switching device may be a two way selection switch. The ARM processor transmits a switching selection signal to switching device. In the first state, the switching device is switched to connect the ARM processor with the LCD and the LCD is controlled by the ARM processor. In the second state, the switching device is switched to connect the X86 processor with the LCD and the LCD is controlled by the X86 processor.

At step 1112, the ARM processor enters a sleep state.

At step 1113, the X86 processor controls, in the second state, the LCD for displaying.

The control process of the LCD by the X86 processor involves the following operations: enabling the BIOS to read information on a graphics card; entering the operation system after the initialization and detection for the graphics card and other devices; and transmitting, by the operating system, the environment variable and the user setting parameter to the graphics card such that the graphics card can control the display. The control process involves the following operations: reading data from the frame buffer area in the memory; transmitting the data to the graphics card via the DMA channel; and outputting, by the graphics card, the data to the LCD for displaying.

Figure 12:
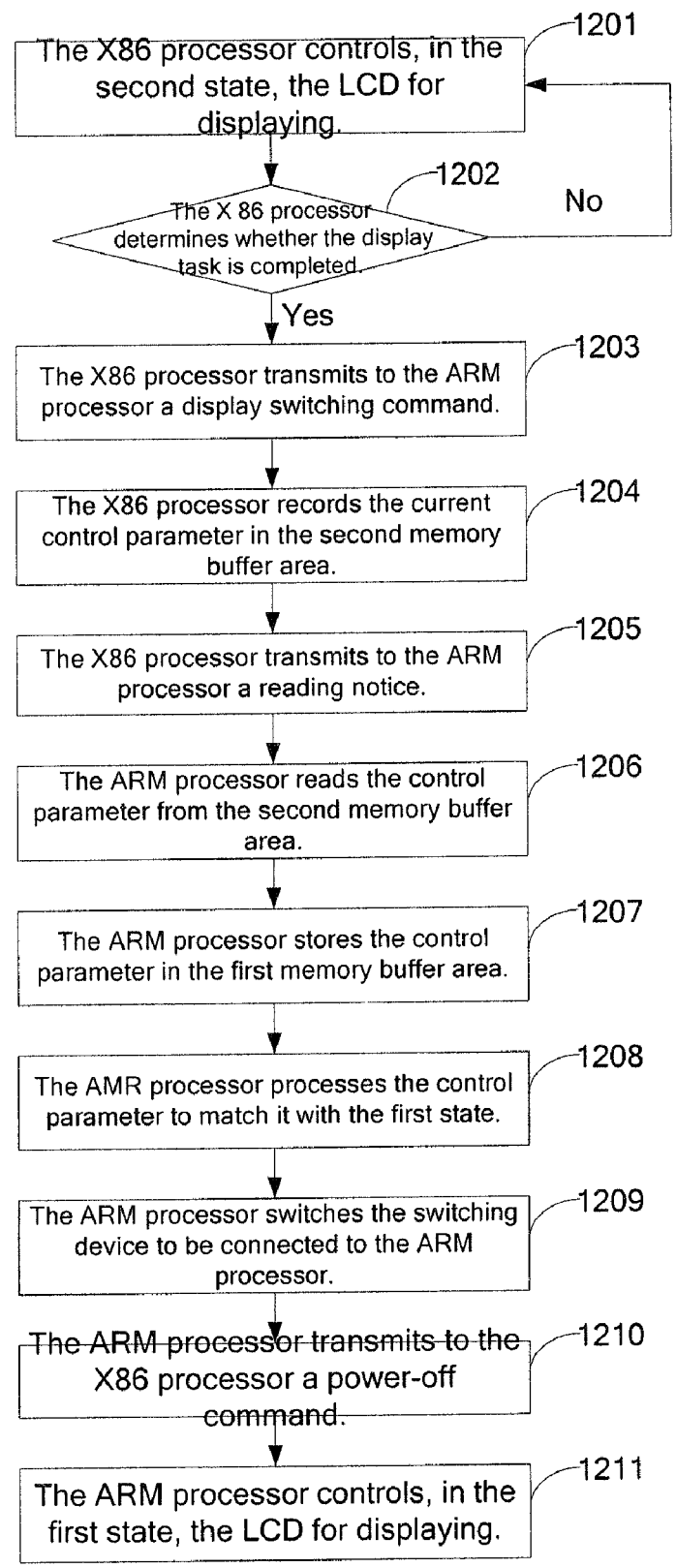
FIG. 12 is a flowchart of the fourth embodiment of the display switching method for the mobile terminal according to the present invention.

FIG. 12 is a flowchart of the fourth embodiment of the display switching method for the mobile terminal according to the present invention. This embodiment shows a display switching process in which the mobile terminal is switched from the second state to the first state after initial power-on. Again, in the following description, as an example, the first processor is an ARM processor, the second processor is an X86 processor and the display module is a LCD. The state in which the display is controlled by the ARM processor is defined as the first state, while the state in which the display is controlled by the X86 processor is defined as the second state, in which the ARM processor is in a sleep state.

At step 1201, the X86 processor controls, in the second state, the LCD for displaying.

At step 1202, the X 86 processor determines whether the display task is completed or not. If so, the process proceeds with step 1203; otherwise, the process returns to step 1201.

In order to reduce the power consumption of the mobile terminal as much as possible, when the X86 processor has accomplished the display task with higher requirement, the mobile terminal can be switched to the first state having lower power consumption.

At step 1203, the X86 processor transmits to the ARM processor a display switching command.

After accomplishing the display task with higher requirement, the X86 processor transmits to the ARM processor a display switching command and prepares to switch to the first state having lower power consumption.

At step 1204, the X86 processor records the current control parameter in the second memory buffer area.

After receiving the display switching command, the X86 processor can record the current control parameter in the second memory buffer area set within the X86 processor prior to switching, so as to ensure that the control parameter currently operating on the mobile terminal remains unchanged after the switching, thereby satisfying a seamless experience of the user during the switching.

Herein, the control parameter may include an environment parameter, a user setting parameter, temporary web recording files for web browsing and the like.

At step 1205, the X86 processor transmits to the ARM processor a reading notice.

At step 1206, the ARM processor reads the control parameter from the second memory buffer area.

At step 1207, the ARM processor stores the control parameter in the first memory buffer area.

At step 1208, the AMR processor processes the control parameter to match it with the first state.

After switching from the second state to the first state, the environment variable and the user parameter, such as call status, volume, time status, display and contrast, remain unchanged after the switching, so as to implement the seamless switching. The parameter after the switching can match with the first state by processing the control parameter, e.g., by rewriting a memory, rewriting a register or reload a driver.

At step 1209, the ARM processor switches the switching device to be connected to the ARM processor.

The switching device may be a two way selection switch. The ARM processor transmits a switching selection signal to switching device. In the first state, the switching device is switched to connect the ARM processor with the LCD and the LCD is controlled by the ARM processor. In the second state, the switching device is switched to connect the X86 processor with the LCD and the LCD is controlled by the X86 processor.

At step 1210, the ARM processor transmits to the X86 processor a power-off command.

At step 1211, the ARM processor controls, in the first state, the LCD for displaying.

The process in which the ARM processor controls the LCD for displaying is the same as that described with respect to the third embodiment, whose description is thus omitted here.

Figure 13:
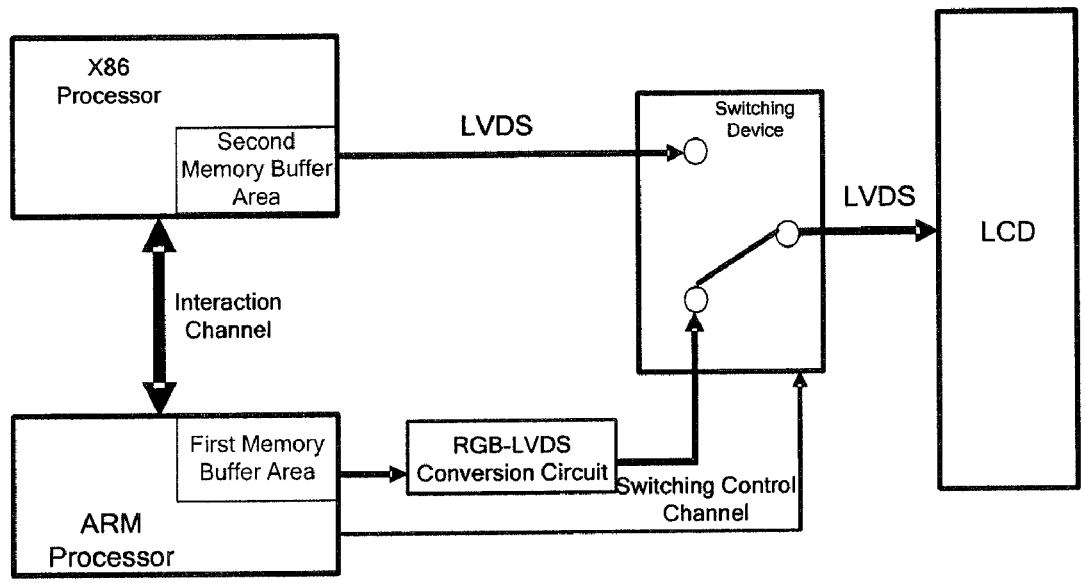
FIG. 13 is a schematic diagram showing the hardware architecture of the mobile terminal in combination with the embodiments of the display switching method as shown in FIG. 11 and FIG. 12.

In combination with FIG. 11 and FIG. 12, FIG. 13 is a schematic diagram showing the hardware architecture of the mobile terminal for performing display switching according to the embodiments of the display switching method of the present invention.

The mobile terminal comprises an ARM processor, an X86 processor, a RGB-LVDS conversion circuit, a switching device and a LCD. There is an interaction channel set between the ARM processor and the X86 processor for transmitting notice messages or data. The ARM processor has a first memory buffer area set therein, and the X86 processor has a second memory buffer areas set therein.

After initial power-on of the mobile terminal, the ARM processor is enabled to enter the first state. The initialization of the ARM processor includes initialization for display parameters such as LCD resolution, LCD scanning frequency, LCD display mode, timing sequence of the control signal for controlling the LCD, frame buffer area for transmitting information to the LCD, and setting of the DMA channel. In the first state, the switching device connects the transmission channel between the ARM processor and the LCD. The ARM processor controls the display of the LCD, including reading/writing the frame buffer area for storing control data using application software and then transmitting the data in the frame buffer area to the LCD via a hardware interface after subjecting the data to the format conversion of the RGB-LVDS conversion circuit.

In the first state, when receiving the display switching command requesting the X86 processor to perform a display task with higher requirement, the ARM processor stores the currently operating control parameter, which includes the environment variable parameter, the user setting parameter and the like, in the first memory buffer area. Afterwards, the ARM processor transmits via the interaction channel a reading notice to the X86 processor. On receipt of this reading notice, the X86 processor reads the control parameter from the first memory buffer area through the interaction channel and stores it in the second memory buffer area. The X86 processor then processes the control parameter in the second memory buffer area to match it with the second state. After this processing, the X86 processor transmits via the interaction channel a notice message to the ARM processor indicating the completion of acquisition of the display parameter. On receipt of this message, the ARM processor controls the switching device for switching. Via the switching, the switching device connects the transmission channel between the X86 processor and the LCD. In this case, the display of the LCD is controlled by the X86 processor and the ARM processor enters a sleep state.

In the second state, when accomplishing a display task, the X86 processor transmits via the interaction channel a display switching command to the ARM processor. The X86 processor stores the currently operating control parameter, which includes the environment variable parameter, the user setting parameter and the like, in the second memory buffer area. Afterwards, the X86 processor transmits via the interaction channel a reading notice to the ARM processor. On receipt of this reading notice, the ARM processor reads the control parameter from the second memory buffer area through the interaction channel and stores it in the first memory buffer area. The ARM processor then processes the control parameter in the first memory buffer area to match it with the first state. After this processing, the ARM processor transmits via the interaction channel a notice message to the X86 processor indicating the completion of acquisition of the display parameter, and controls the switching device for switching. Via the switching, the switching device connects the transmission channel between the ARM processor and the LCD. In this case, the display of the LCD is controlled by the ARM processor. Meanwhile, the ARM processor transmits to the X86 processor a power-off command. On receipt of this command, the X86 processor is powered off to save the power consumption of the mobile terminal.

Corresponding to the embodiments of the display switching method for the mobile terminal of the present invention, the embodiments of the mobile terminal are also provided. The mobile terminal of the present invention comprises at least a first processor and a second processor, which can be in practice an ARM processor and an X86 processor, respectively. The state in which the display module is controlled by the first processor is defined as the first state, while the state in which the display module is controlled by the second processor is defined as the second state.

Figure 14:
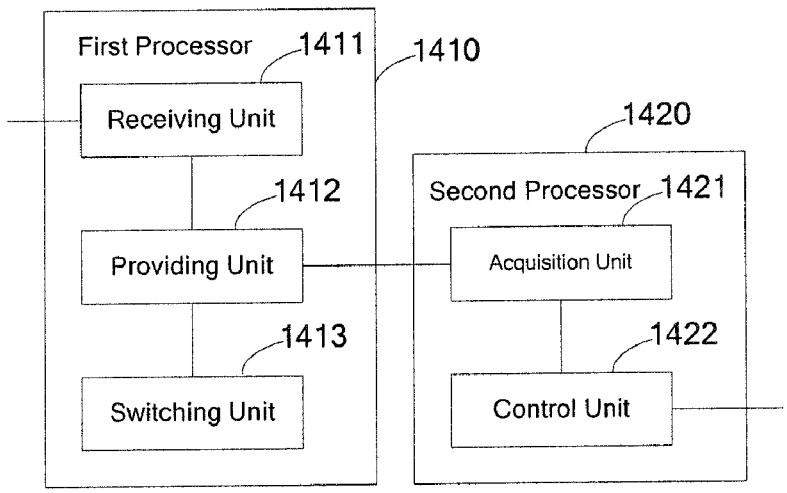
FIG. 14 is a block diagram of the first embodiment of the mobile terminal according to the present invention.

FIG. 14 is a block diagram of the first embodiment of the mobile terminal according to the present invention. The mobile terminal comprises a first processor 1410 and a second processor 1420.

Herein, the first processor 1410 comprises: a receiving unit 1411 configured to receive a display switching command in the first state; a providing unit 1412 configured to obtain a control parameter and transmit the control parameter to the second processor 1420 based on the display switching command; and a switching unit 1413 configured to control the mobile terminal to switch to the second state.

The second processor 1420 comprises: an acquisition unit 1421 configured to acquire the control parameter provided by the providing unit; and a control unit 1422 configured to control the display module according to the control parameter.

Figure 15:
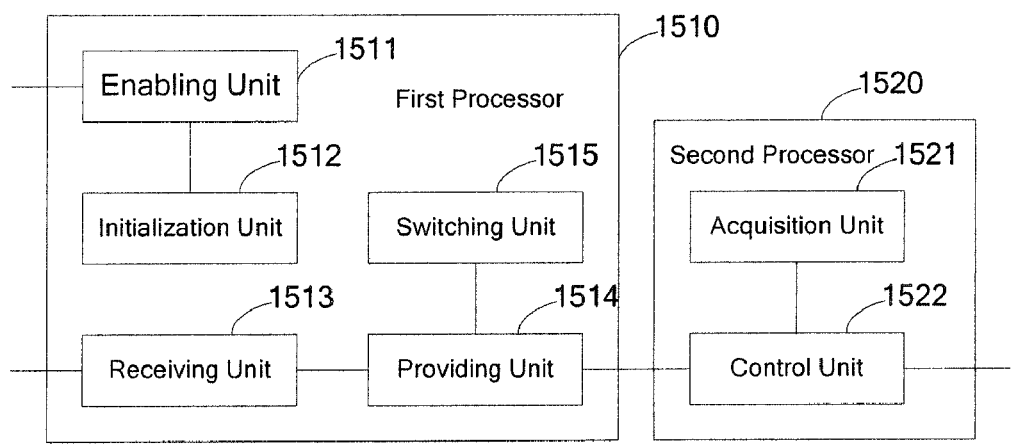
FIG. 15 is a block diagram of the second embodiment of the mobile terminal according to the present invention.

FIG. 15 is a block diagram of the second embodiment of the mobile terminal according to the present invention. The mobile terminal comprises a first processor 1510 and a second processor 1520.

Herein, the first processor 1510 comprises: an enabling unit 1511 configured to enable, after initial power-on of the mobile terminal, the first processor to enter the first state; an initialization unit 1512 configured to initialize a display parameter such that the display parameter can match with the characteristics of the display module; a receiving unit 1513 configured to receive a display switching command in the first state; a providing unit 1514 configured to obtain a control parameter and transmit the control parameter to the second processor 1520 based on the display switching command; and a switching unit 1515 configured to control the mobile terminal to switch to the second state.

The second processor 1520 comprises: an acquisition unit 1521 configured to acquire the control parameter provided by the providing unit; and a control unit 1522 configured to control the display module according to the control parameter.

Herein, the providing unit 1514 can comprise (not shown in FIG. 15): a notice transmission unit configured to transmit an enabling command to the second processor; and a parameter recording unit configured to record the current control parameter in the first memory buffer area, the control parameter comprising at least an environment variable parameter and a user setting parameter.

Herein, the acquisition unit 1521 can comprise (not shown in FIG. 15): a parameter reading unit configured to read the control parameter from the first memory buffer area; a parameter storage unit configured to store the control parameter in the second memory buffer area; and a parameter processing unit configured to process the control parameter such that the processed control parameter matches with the second state.

In particular, the switching unit 1515 can comprise (not shown in FIG. 15): a notice receiving unit configured to receive a notice message transmitted from the second processor indicating the completion of acquisition of the display parameter; and a switching device conversion unit configured to control the switching device to convert from a state as being connected to the first processor to a state as being connected to the second processor.

Figure 16:
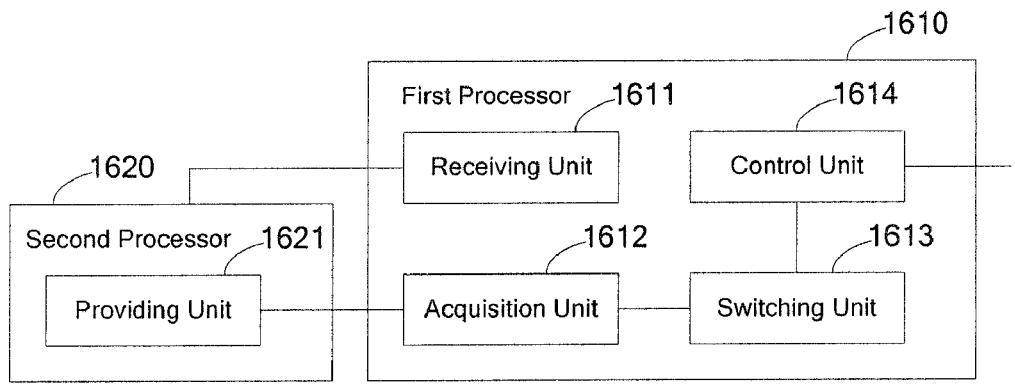
FIG. 16 is a block diagram of the third embodiment of the mobile terminal according to the present invention.

FIG. 16 is a block diagram of the third embodiment of the mobile terminal according to the present invention. The mobile terminal comprises a first processor 1610 and a second processor 1620.

Herein, the first processor 1610 comprises: a receiving unit 1611 configured to receive a display switching command transmitted from the second processor in the second state.

The second processor 1620 comprises: a providing unit 1621 configured to obtain a control parameter and transmit the control parameter to the first processor.

The first processor 1610 further comprises: an acquisition unit 1612 configured to acquire the control parameter provided by the providing unit; and a switching unit 1613 configured to control the mobile terminal to switch to the first state; and a control unit 1614 configured to control the display module according to the control parameter.

Herein, the providing unit 1612 can comprise (not shown in FIG. 16) a parameter recording unit configured to record the current control parameter in the second memory buffer area, the control parameter comprising at least an environment variable parameter and a user setting parameter.

Herein, the acquisition unit 1612 can comprise (not shown in FIG. 16): a parameter reading unit configured to read the control parameter from the second memory buffer area; a parameter storage unit configured to store the control parameter in the first memory buffer area; and a parameter processing unit configured to process the control parameter such that the processed control parameter matches with the first state.

Herein, the switching unit 1613 can comprise (not shown in FIG. 16): a switching device conversion unit configured to control the switching device to convert from a state as being connected to the second processor to a state as being connected to the first processor; and a command transmission unit configured to transmit a power-off command to the second processor.

It is to be noted that the present invention is applicable to mobile terminals having dual processors, such as a mobile phone, a PDA or a notebook computer. It can be seen from the above embodiments that the first and second processors of the mobile terminal according to the present invention can control the display module separately. After receiving the display switching command, these two processors exchange the control parameter such that the processor to which the display control is switched can control the display module based on the control parameter independently. The two processors of the present invention can control the display module separately such that the display control can be switched to the appropriate processor according to the display content, thereby improving the flexibility of the display control. Further, as only one processor controls the display module, the system power consumption can be reduced.

It can be appreciated by those who skilled in the art that the present invention can be implemented by software in combination of necessary generic hardware platform. Based on this understanding, the solution of the present invention or the part contributive to the prior art can be substantially embodied in software product. This computer software product can be stored in a storage medium, such as ROM/RAM, magnetic disk, optical disk and the like, and comprises several instructions for causing a computer device (which can be a personal computer, a server or a network device) to perform the method described in the respective embodiments, or some parts thereof, according to the present invention.

The above embodiments of the present invention cannot be construed as limiting the scope of the present invention. Therefore, modifications, equivalent alternatives and improvements can be made to the above embodiments without departing from the spirit and principle of the present invention, which should be encompassed by the scope of the present invention.

What is claimed is:

1. An operation mode switching method for a mobile terminal communication system, the mobile terminal comprising a communication processor and an application processor, wherein a mode in which the communication processor performs only a communication function is defined as a communication mode, and a mode in which the communication processor performs both the communication function and an application function is defined as an application mode, the method comprising the following steps of:

acquiring, in the application mode, a switching trigger information indicating to switch to the state in which the application processor is in control;

controlling the communication processor to switch from the application mode to the communication mode based on the acquired switching trigger information;

uploading, by the communication processor, an application program and a user control interface after the communication processor transmits an enabling command to the application processor;

enabling, by the communication processor, a communication interface and loading a serial port modulation/demodulation processing program;

enabling, by the application processor, the communication interface and loading a serial port modulation/demodulation processing program;

loading, by the application processor, a drive and an operating system and loading the application program and the user interface for the application processing system; and communicating, by the application processor, with the communication processor via the communication interface.

2. The method according to claim 1, further comprising:
entering, by the mobile terminal, the application mode in which the communication processor is in control after initial power-on.

3. The method according to claim 2, wherein the step of entering by the mobile terminal the application mode in which the communication processor is in control after initial power-on comprises:

loading, by the communication processor, a communication protocol stack, a file system and an application program after the initial power-on of the mobile terminal; and executing the loaded application program and entering a communication system control interface.

4. The method according to claim 1, further comprising, after enabling the communication interface and loading the serial port modulation/demodulation processing program by both the communication processor and the application processor, a step of:

determining whether the communication processor is currently in a communication state, wherein if it is determined that the communication processor is currently in the communication state, the communication processor invokes the serial port modulation/demodulation processing program to manage the communication state; otherwise the step of loading by the application processor the application program and the user interface for the application processing system is performed.

5. The method according to claim 1, further comprising, after the step of loading by the application processor the application program and the user interface for the application processing system, a step of:

determining whether the communication processor is currently in the communication state, wherein if it is determined that the communication processor is currently in the communication state, the application processor invokes the serial port modulation/demodulation processing program and a communication application program; otherwise the application processor performs the step of communicating with the communication processor via the communication interface.

6. An operation mode switching method for a mobile terminal communication system, the mobile terminal comprising a communication processor and an application processor, wherein a mode in which the communication processor performs only a communication function is defined as a communication mode, and a mode in which the communication processor performs both the communication function and an application function is defined as an application mode, the method comprising the steps of:

acquiring, in the communication mode, a switching trigger information indicating switching from the state in which the application processor is in control to the state in which the communication processor is in control;

controlling the communication processor to switch from the communication mode to the application mode based on the acquired switching trigger information;

detecting, by the communication processor, that the application processor is powered off after performing a power-off program;

uploading, by the communication processor, the serial port modulation/demodulation processing program;

loading, by the communication processor, the shared peripheral an application program and a communication system control interface; and causing the communication processor to enter the application mode.

7. A mobile terminal, comprising a communication processor and an application processor, wherein a mode in which the communication processor performs only a communication function is defined as a communication mode, and a mode in which the communication processor performs both the communication function and an application function is defined as an application mode, wherein the communication processor comprises:

a first acquisition unit configured to acquire, in the application mode, switching trigger information, comprising a switching information acquisition unit configured to acquire, when the mobile terminal further comprises an application processor, information indicating to switch to the state in which the application processor is in control; and a first control unit configured to control the communication processor to switch from the application mode to the communication mode based on the acquired switching trigger information, comprising a first unload unit configured to unload an application program and a user control interface after transmitting to the application processor an enabling command; and a first load unit configured to enable a communication interface and load a serial port modulation/demodulation processing program; and the application processor further comprising a second enabling unit configured to enable the communication interface and load the serial port modulation/demodulation processing program;

a second load unit configured to load a drive and an operating system and to load the application program and the user interface for the application processing system; and a communication control unit configured to communicate with the communication processor via the communication interface.

8. The mobile terminal according to the claim 7, wherein the communication processor further comprises:
an initialization unit configured to enter the application mode in which the communication processor is in control after initial power-on of the mobile terminal.

9. The mobile terminal according to claim 7, wherein the first control unit further comprises: a first determination and execution unit configured to invoke, when determining the communication processor is currently in the communication state, the serial port modulation/demodulation processing program to manage the communication state; and
the application processor further comprises a second determination and execution unit configured to invoke, when determining the communication processor is currently in the communication state, the serial port modulation/demodulation processing program and the communication application program.

10. The mobile terminal according to claim 7, wherein the first acquisition unit further comprises:
an access information acquisition unit configured to receive information indicating to enter the communication mode when the mobile terminal accesses another electronic device; and
the first control unit further comprises:
a third unload unit configured to unload the application program and the user interface; and
a third load unit configured to load the serial port modulation/demodulation processing program and then enter the communication mode in which only the data communication function is performed.

11. A mobile terminal, comprising a communication processor and a application processor, wherein a mode in which the communication processor performs only a communication function is defined as a communication mode, and a mode in which the communication processor performs both the communication function and an application function is defined as an application mode, wherein the communication processor comprises:
a second acquisition unit configured to acquire, in the communication mode, switching trigger information, comprising
a switching information acquisition unit configured to acquire information indicating switching from the state in which the application processor is in control to the state in which the communication processor is in control; and
a second control unit configured to control the communication processor to switch from the communication mode to the application mode based on the switching trigger information, comprising
an unload detection unit configured to detect for the communication processor that the application processor is powered off after performing a power-off program;
a first unload unit configured to unload the serial port modulation/demodulation processing program; and
a first load unit configured to load a shared peripheral, an application program and a communication system control interface, causing the communication processor to enter the application mode.

12. The mobile terminal according to claim 11, wherein the second acquisition unit comprises:

a disconnection information acquisition unit configured to acquire information indicating the disconnection of the mobile terminal from another electronic device or incoming call information received when accessing another electronic device; and
the second control unit comprises:
a second unload unit configured to unload the serial port modulation/demodulation processing program; and
a second load unit configured to load the application program and the communication system control interface, causing the communication processor to enter the application mode.

13. A switching method for a mobile terminal, comprising a first processor and a second processor, wherein a state in which a shared peripheral is controlled by the first processor is defined as a first state and a state in which the shared peripheral is controlled by the second processor is defined as a second state, the method comprising the following steps of:
receiving, by the first processor, a switching command in the first state; and
controlling the mobile terminal to switch from the first state to the second state based on the switching command.

14. A display switching method for a mobile terminal which comprises at least a first processor and a second processor, a state in which a display module is controlled by the first processor being defined as a first state and a state in which the display module is controlled by the second processor being defined as a second state, the method comprising the following steps of:
receiving, by the first processor, a display switching command in the first state;
obtaining, by the first processor, a control parameter;
transmitting, by the first processor, the control parameter to the second processor for controlling the mobile terminal to switch to the second state; and
controlling, by the second processor, the display module according to the control parameter.

15. The method according to claim 14, further comprising:
enabling, after initial power-on of the mobile terminal, the first processor to enter the first state; and
initializing, by the first processor, a display parameter such that the display parameter matches with characteristics of the display module.

16. The method according to claim 14, wherein the step of transmitting by the first processor the control parameter to the second processor comprises:
recording, by the first processor, the current control parameter in a first memory buffer area, the control parameter comprising at least an environment variable parameter and a user setting parameter;
transmitting, by the first processor, a reading notice to the second processor;
reading, by the second processor, the control parameter from the first memory buffer area;
storing, by the second processor, the control parameter in a second memory buffer area; and
processing the control parameter such that the processed control parameter matches with the second state.

17. The method according to claim 14, wherein the step of controlling the mobile terminal to switch to the second state comprises:
receiving, by the first processor, a notice message transmitted from the second processor indicating the completion of acquisition of the display parameter; and controlling a switching device to switch from a state as being connected to the first processor to a state as being connected to the second processor.

18. A display switching method for a mobile terminal which comprises at least a first processor and a second processor, a state in which a display module is controlled by the first processor being defined as a first state and a state in which the display module is controlled by the second processor being defined as a second state, the method comprising the following steps of:
receiving, by the first processor, a display switching command transmitted from the second processor in the second state;
obtaining, by the second processor, a control parameter;
transmitting, by the second processor, the control parameter to the first processor; and
controlling, by the first processor, the display module according to the control parameter after controlling the mobile terminal to switch to the first state.

19. The method according to claim 18, wherein the first processor is in sleep state in the second state; and
the display switching command transmitted from the second processor is a switching command transmitted by the second processor after accomplishing a display task which is a display task contained in the display switching command transmitted from the first processor to the second processor prior to switching to the second state.

20. The method according to claim 18, wherein the step of transmitting by the second processor the current control parameter to the first processor comprises:
recording, by the second processor, the current control parameter in a second memory buffer area, the control parameter comprising at least an environment variable parameter and a user setting parameter;
transmitting, by the second processor, a reading notice to the first processor;
reading, by the first processor, the control parameter from the second memory buffer area;
storing, by the first processor, the control parameter in a first memory buffer area; and
processing the control parameter such that the processed control parameter matches with the first state.

21. The method according to claim 18, wherein the step of controlling by the first processor the mobile terminal to switch to the first state comprises:
controlling, by the first processor, a switching device to switch from a state as being connected to the second processor to a state as being connected to the first processor; and
transmitting, by the first processor, a power-off command to the second processor.

22. A mobile terminal, comprising at least a first processor and a second processor, a state in which a display module is controlled by the first processor being defined as a first state and a state in which the display module is controlled by the second processor being defined as a second state, wherein
the first processor comprises:
a receiving unit configured to receive a display switching command in the first state;
a providing unit configured to obtain a control parameter and transmit the control parameter to the second processor; and
a switching unit configured to control the mobile terminal to switch to the second state; and
the second processor comprises:
an acquisition unit configured to acquire the control parameter provided by the providing unit; and
a control unit configured to control the display module according to the control parameter.

23. The mobile terminal according to claim 22, wherein the first processor further comprises:
an enabling unit configured to enable, after initial power-on of the mobile terminal, the first processor and then enter the first state; and
an initialization unit configured to initialize a display parameter such that the display parameter matches with characteristics of the display module.

24. The mobile terminal according to claim 22, wherein the providing unit comprises:
a parameter recording unit configured to record the current control parameter in the first memory buffer area, the control parameter comprising at least an environment variable parameter and a user setting parameter; and
a notice transmission unit configured to transmit a reading notice to the second processor; and
the acquisition unit comprises:
a parameter reading unit configured to read the control parameter from the first memory buffer area;
a parameter storage unit configured to store the control parameter in the second memory buffer area; and
a parameter processing unit configured to process the control parameter such that the processed control parameter matches with the second state.

25. The mobile terminal according to claim 22, wherein the switching unit comprises:
a notice receiving unit configured to receive a notice message transmitted from the second processor indicating the completion of acquisition of the display parameter; and
a switching device conversion unit configured to control the switching device to convert from a state as being connected to the first processor to a state as being connected to the second processor.

26. A mobile terminal, comprising at least a first processor and a second processor, a state in which a display module is controlled by the first processor being defined as a first state and a state in which the display module is controlled by the second processor being defined as a second state, wherein
the first processor comprises:
a receiving unit configured to receive a display switching command transmitted from the second processor in the second state; and
the second processor comprises:
a providing unit configured to obtain a control parameter and transmit the control parameter to the first processor; and
the first processor further comprises:
an acquisition unit configured to acquire the control parameter provided by the providing unit; and
a switching unit configured to control the mobile terminal to switch to the first state; and
a control unit configured to control the display module according to the control parameter.

27. The mobile terminal according to claim 26, wherein the providing unit comprises:
a parameter recording unit configured to record the current control parameter in the second memory buffer area, the control parameter comprising at least an environment variable parameter and a user setting parameter; and
a notice transmission unit configured to transmit a reading notice to the first processor; and
the acquisition unit comprises:
a parameter reading unit configured to read the control parameter from the second memory buffer area;

a parameter storage unit configured to store the control parameter in the first memory buffer area; and a parameter processing unit configured to process the control parameter such that the processed control parameter matches with the first state.

28. The mobile terminal according to claim 26, wherein the switching unit comprises:

a switching device conversion unit configured to control the switching device to convert from a state as being connected to the second processor to a state as being connected to the first processor; and a command transmission unit configured to transmit a power-off command to the second processor.

* * * * *